405-3
OR X SR 5,351
5351X
J. T. Ely.
Dock,
Patented Jan. 28, 1829.
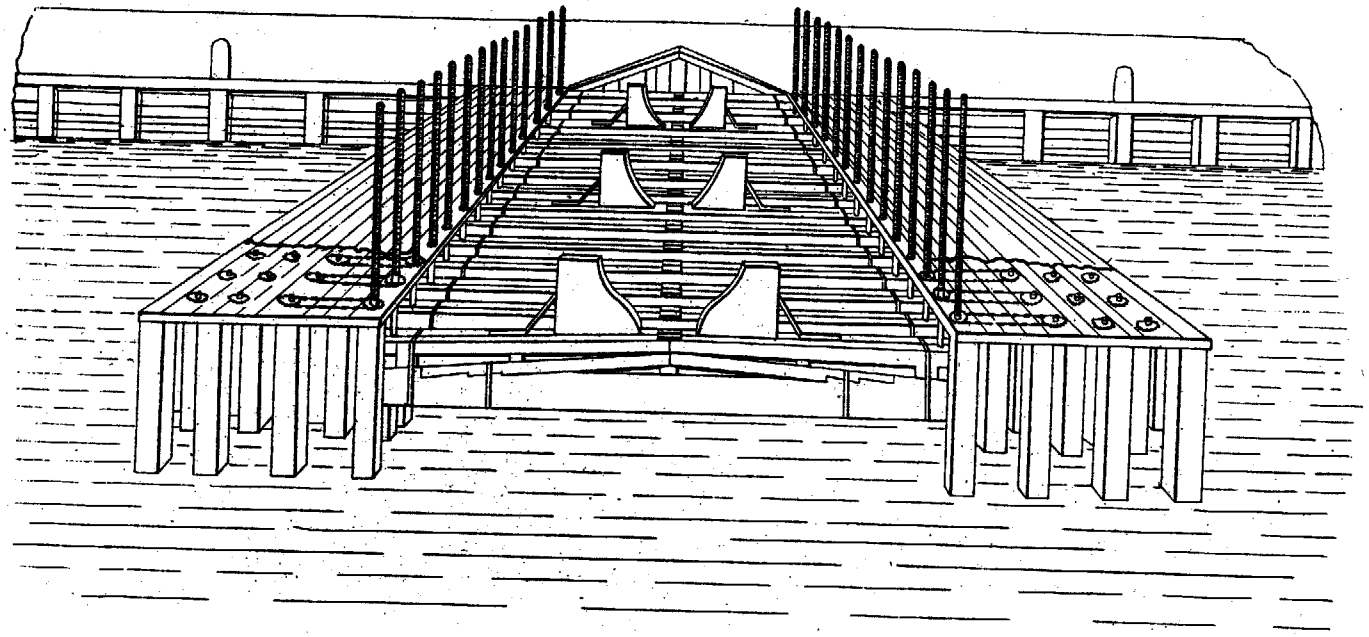

1

Jan 28. 1829

John C. Ely.

Letters Patent.

The Schedule referred to in these Letters Patent and making part of the same, containing a description in the words of the said John C. Ely himself, of his improvement in the Screw Dock.

Having selected a place for the dock where the water is of sufficient depth, if the shore is not sufficiently bold to form the head of the dock; build a wharf for this purpose, and from this wharf build two piers running parallel to each other one hundred and twenty feet into the water, or far enough to enclose the machinery of the dock proposed to be built; these piers should be thirty three feet apart, and may be filled up solid or be built on piles as may be most convenient; and they should each be about eighteen or twenty feet in width at the top; and should be covered with plank or some other good flooring. To provide for receiving the deck frame and for raising the vessel, when in the dock, place two heavy pieces of timber or plates say twenty by twenty four inches square against the inner upper edge of each pier, so as that the upper surface of the plate may be even with the surface of the piers, and so that the plates may project their width inwards. These plates must be well secured in their places by posts or uprights or piles placed under them against the inner side of the piers. These posts must be very large and placed within a short distance of each other. As these plates sustain the whole weight of the machinery of the dock, as well as the vessel when raised, there should be at least as many [illegible] 1.

raised her keel rests on these sections and crosses them in their centre
at right angles. Each section is composed of four pieces of strong or
firm timber thirty five feet long and should be eighteen inches square.
The two upper pieces are placed directly over and about two feet above
the two under piers, and parallel to each other leaving a space between
the timbers sufficiently wide to admit the screw. The upper and lower
timbers are fastened together by posts at the end, and braced from
the ends to the centre in such a manner as to sustain the greatest
possible weight. The object of forming these sections in this man=
ner with two timbers one over the other, is to enable the workman
to secure them by the common method of bracing and bolting
in such a manner as to sustain the weight of the heaviest ships or
without yielding or springing. These sections are suspended in the
dock from the plates above described on thirty two screws passing
through said plates down through the ends of each section in such
a manner that the sections will lie parallel to and at equal
distances from each other, and at right angles with the plates or
sides of the dock. The screws may be secured in the ends of the
sections by keys passing through them or by a female screw nut
or casting of sufficient size to sustain the sections. Whenever it is
intended to use the dock for taking in steamboats the screws or
should be secured in the ends of the section by a female screw nut
or casting so as to let the screw pass through far enough to admit a
steamboat into the dock, with the guards of the boat elevated above
the plates of the dock; this is done by passing the screw so far through the female
screws in the sections as to prevent the [illegible] or heads of the screws from coming in con
tact with the guard of the boat when raising it. these screws may be of
wood, iron, or brass. wooden screws will do very well for small docks,
but iron or brass are better for large docks. for a dock of sufficient size
and strength to raise a ship of five hundred tons, which is the one [illegible]

It would be inexpedient to put wooden screws into a dock of this size;
they should be used in small docks only, and that when they would
be cheaper than iron or brass; and when used their size must be fixed
by the Judgment of the workman from his knowledge of the timber
of which they are to be made and the weight to be raised. Circular
plates or castings twenty four inches in diameter and two inches
thick are put upon the beams or plates through which the screws pass.
upon these plates, round the holes in the centre through which the screws
pass and within about one inch of the screws is cast a circular
groove to admit the friction balls or rollers used in turning up the
screws. The nut or female screw, by which the Male screw is turned
up should cover about eighteen inches of the male screw, so that it
will be in no danger of stripping; the body of the nut or female screw
should be from ten to twelve inches in diameter and may be circular
or eight square with a projection of five inches at the bottom like
the brim of a hat with the crown uppermost; which projection should
be two inches thick. Friction balls or rollers are placed in the groove
of the plates under the nuts or female screws so as to take off the
friction as much as possible when the screws are raised up. Flooring
should be put over each section separately, so that each may be raised
or lowered by itself; and when so that when two or more sections
are placed on a level they will form a convenient platform for the
workmen upon the vessel. When the vessel is in the dock ready to be
raised it must be secured by proper shores, blocks or bilge wedges. To enable one man
to turn up each screw in the easiest and most convenient manner place a
roach wheel, two feet in diameter and two inches thick, over the above
described nut or female screw, so that it will set snug and secure
it by a pin to the projection. another similar wheel is placed opposite each
screw upon a shaft secured in the centre of the pier. These wheels are
connected by a chain with equal links passing round them and corres-
ponding with the teeth on the roach wheels; and thus the power ap-
[illegible] wheel in the centre of the pier is made to bear upon the he lever is applied and can keep the screw constantly in motion.
pon the shaft upon which the reach wheel is placed, in the
entre of the piers place a common spur wheel, two feet in diam
ter and two inches thick; let this wheel mash or gear into a
nother similar wheel of half the size, placed upon another s
haft, and let this wheel gear or mash into another similar wheel
nd half the size of the last wheel, placed upon another shaft.
ach of these wheels must be so formed that a lever can be applied
o turn them; and the labourer when he finds the first wheel turns
to hard applies his lever to the second and so to the third as the
weight increases, until the ship is up. Each wheel increases his
ower but decreases the speed with which he raises the screw. When
the vessel is properly secured upon the sections the men are placed
t the screws and each screw is turned up so that each section
nay sustain its due proportion of the ships weight while raising.
o enable the workmen to raise a very heavy ship with more ease,
nd when it may be thought necessary to relieve the screws in some
degree, attach a weight to each end of each section by a chain pass
ing over a pulley or wheel, secured to the plates above with proper
ooks and latches to secure the weight to the chain and to secure the
hain in any position desired, and so fixed that the weight may be easily ap
lied to the section or taken off at pleasure. Each weight may be from five
fifteen tons, more or less, as may be thought expedient; and as it may be
ought advisable in the manner to relieve the workmen and ease
e screws. These weights serve also to regulate the pressure on the
rews and render it more equable. They may, however, be provided
not, at the pleasure of the builder or owner of the dock. They do
ot make a necessary part of the machine any more than the above describ
ring for more easily turning up the screws; as it is obvious that that the
rews may be turned up by any power which the operator chooses to apply;

dock nor any one of the several minor improvements which
I have made in it and which I believe to be my invention,
But I do claim as my invention the above described method of
applying the screws whereby the sections are suspended upon the
screws and are not forced up by the screws having a firm rest
or bearing under water upon which they rest. by the above method
of applying the screw invented by me as the vessel is secured [illegible]
harder on the screws, the part of the screw exposed grows shorter and is
thereby much less liable to break. There are other advantages arising from
this new method of applying a screw in the screw docks which will be
easily discovered on examining the docks. I further claim as my
improvement the application of weights to the raising of boats in a
screw dock as above described acting in combination with the screws.
I further claim as my improvement the above described method
of so adjusting and preparing the sections by passing the male screws
through the female screws placed at the ends of the sections so that a
Steamboat with her guards and all her machinery in may be taken into
a dock of a width sufficient to receive her hulls. I further claim as my
improvement, the above combination of pulleys and chains and
gearing so as to enable a man by one continued motion in a circle
around the wheel on which the [illegible] is placed, to raise any of the screws
to which the gearing is attached. The above specification is ac-
companied with a drawing which will further and more
distinctly describe the different parts of the dock and to which
reference is made. [illegible] which improvements I re-
quest a patent. Witness my hand this Twenty sixth day
of December eighteen hundred and twenty eight.

Witnesses
Geo. C. Goddard
Stephen C. Williams

[illegible] C. Ely

2170 Words.